No. 802,958. PATENTED OCT. 24, 1905.
I. G. WATERMAN.
ELECTROMAGNETIC VALVE.
APPLICATION FILED FEB. 8, 1904.
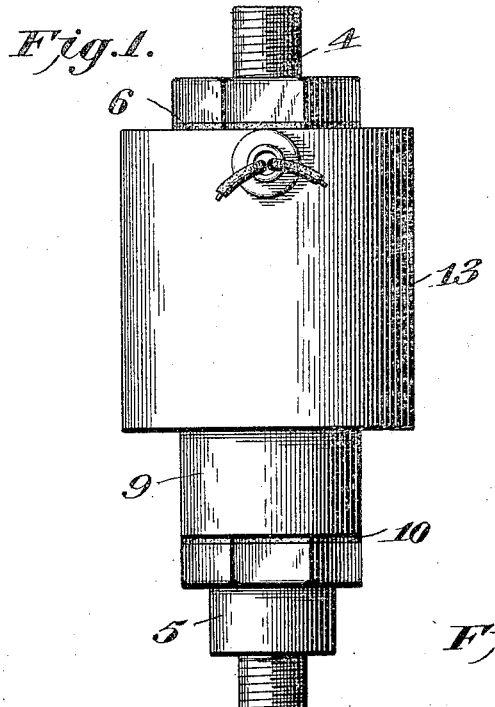
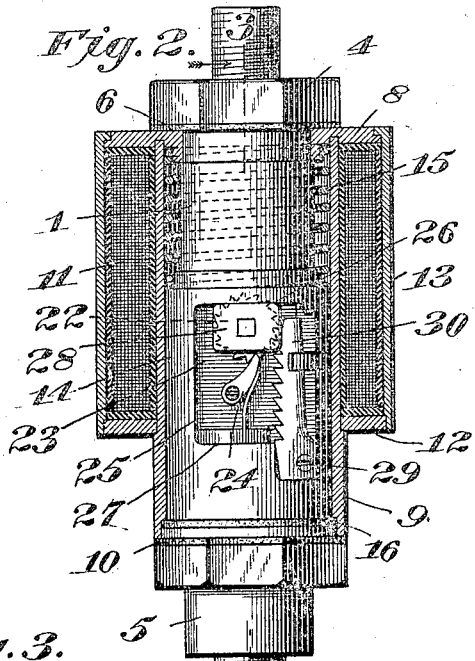
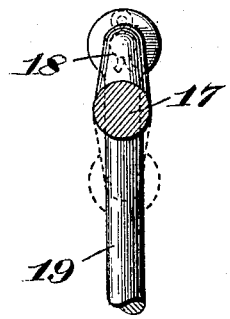
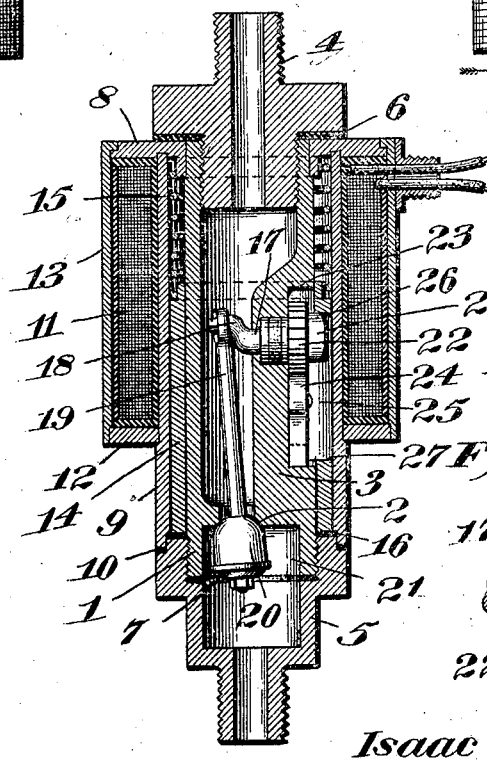
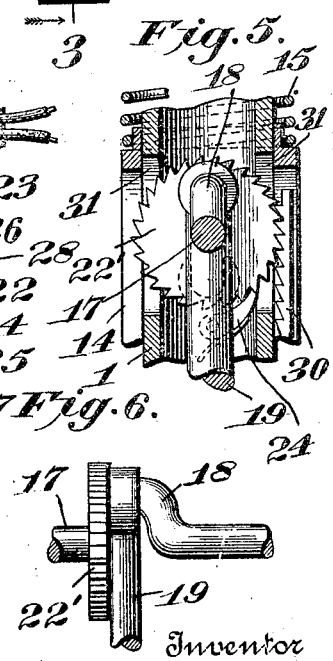
Witnesses
Elmer Leavey
Sarah V. Lockwood
Inventor
Isaac G. Waterman
by Geo. A. Hamlin
his Attorney

UNITED STATES PATENT OFFICE.

ISAAC G. WATERMAN, OF SANTA BARBARA, CALIFORNIA.

ELECTROMAGNETIC VALVE.

No. 802,958. Specification of Letters Patent. Patented Oct. 24, 1905.

Application filed February 8, 1904. Serial No. 192,503.

*To all whom it may concern:*

Be it known that I, ISAAC G. WATERMAN, a citizen of the United States, residing at Santa Barbara, county of Santa Barbara, and State of California, have invented certain new and useful Improvements in Electromagnetic Valves, of which the following is a specification.

My invention relates to electromagnetic valves.

The object of the present invention is the provision of an improved and novel electromagnetic reciprocating valve which will be of compact form and construction, few parts, reliable in its opening and closing actions, and which will not leak, the invention being more particularly directed toward the provision of a reciprocating valve which when closed will be held seated by the fluid-pressure and opened and closed electromagnetically.

Other objects are generally to provide an improved reciprocating valve employing novel means for opening and closing the valve from the armature and to provide an electromagnetic valve wherein the armature slides on the fluid-pipe and the valve is operable in said pipe and the electromagnet or solenoid surrounds the pipe.

In the present invention I employ certain features which are set forth and claimed in a series of applications which I have filed heretofore and to which in this application I make no claim *per se*, but only in their novel association with the seat-valve and operating mechanism therefor.

In the following specification the new features of the present invention are distinguished from elements and constructions on which I have heretofore filed applications for patent.

The invention is set forth in detail hereinafter, and the novel features are recited in the appended claims.

In the accompanying drawings, Figure 1 is a side elevation; Fig. 2, a sectional view showing the armature, the pawl, and other parts in full lines; Fig. 3, a section taken on a line 3 3 of Fig. 2; Fig. 4, a detail of the valve-operating device; Figs. 5 and 6, details of modifications.

The valve is carried by the fluid-pipe section 1, having the valve-seat 2 and the solid portion 3. A union or coupling 4 is screwed into one end of the pipe-section 1 for attachment to the pipe at that end, and a union or coupling 5 is screwed on the other end of pipe-section 1 for connection to the pipe at that end. Suitable packing 6 is employed for the union 4 and packing 7 for the union 5. Secured to the pipe-section 1 is a metal head or end 8, and 9 is a metal tube which has packing 10 interposed between its end and the union or coupling 5. A wire solenoid or coil 11 surrounds the tube or shell 9 and is located between the head 8 and another head 12, a suitable inclosing-shell 13 surrounding the solenoid. Encircling the pipe-section 1 and located between said section and the shell 9 is a tubular armature 14, which is pressed in one direction by a coil-spring 15, a suitable buffer of deadening material 16 quieting the impact of the armature against the coupling 5.

Journaled in the solid portion 3 is a short shaft 17, having a crank-arm 18 on its inner end. To the crank-arm is pivoted the stem 19 of a reciprocating valve 20, adapted to be drawn against the seat 2 and held thereon by the fluid-pressure after seating. This reciprocating valve is swung off its seat on the turning of the crank-arm 18, and a chamber 21 is provided for its accommodation when thus unseated. The valve may be provided with a suitable cushion-face, if desired, to insure proper seating; but this is not absolutely necessary. The shaft 17 has a ratchet-wheel 22, which lies in a cut-out portion 23 in the pipe-section 1, and a spring-pressed dog 24, lying in the cut-out portion 23 and pivoted to the pipe-section 1, engages the ratchet-wheel and prevents backward turning thereof. The armature is provided with a cut-out portion 25, having upper and lower shoulders 26 and 27, and secured on the shaft 17 is a polygonal nut 28, which is engaged on its edges by the shoulders 26 and 27, according to whether the armature is in the position shown in Fig. 2 or drawn into the solenoid on energization thereof. This construction is provided to insure exact seating or unseating of the valve if the action of the armature for any reason does not perfectly position the shaft 17 to properly seat or unseat the valve. Pivoted to the armature at 29 is a spring-pressed pawl 30, having teeth which are held in engagement with the ratchet-wheel 22. When the armature is drawn into the solenoid, the teeth of the pawl engage and turn the ratchet-wheel to either open or close the valve, according to its former position, and on the deënergization of the solenoid the spring 15 throws the armature back to the position shown in Fig. 2, the pawl meanwhile riding idly on the ratchet-wheel and the dog 24 preventing backward turning of the ratchet-wheel. As the ratchet-wheel 22 turns the shaft 17 turns with it, and the crank 18 moves the valve-stem 19 to either open or close the valve. It will be understood that alternate energizations of the solenoid cause alternate opening and closing of the valve 20, and when the valve 20 is on its seat the fluid-pressure coming through the coupling 5 holds the valve on its seat, while when the valve is unseated the dog 24 prevents seating thereof by the fluid-pressure.

In the modified construction shown in Figs. 5 and 6 the shaft 17 is journaled in opposite sides of the pipe-section 1, and the ratchet-wheel 22' is located inside the pipe-section 1 instead of on the outside thereof, and the teeth of said ratchet-wheel project through slots 31 in the sides of the pipe-section for engagement by the dog 24 and the pawl 30, which are suitably positioned to coöperate with said ratchet-wheel. The valve-stem 19 is pivoted on the crank portion 18 of the shaft 17, as before.

In the present application I lay no claim to the general arrangement of the armature and the solenoid on the pipe-section nor to the couplings, as the general construction thereof is disclosed in my prior applications, Serial No. 171,215, Serial No. 172,489, Serial No. 188,784, and Serial No. 188,786, nor do I lay claim in this application to the manner of operating the ratchet-wheel by a pawl on the armature and a dog to prevent backward turning, as this general construction exists in my prior applications, Serial No. 164,888, Serial No. 172,489, Serial No. 171,215, Serial No. 188,782, Serial No. 188,783, Serial No. 188,784, Serial No. 188,785, Serial No. 188,786, and Serial No. 188,787, and no claim *per se* is laid herein to the means for adjusting the position of the valve-operating member by the use of the shoulders on the armature and the nut on the valve-operating member, as this construction is disclosed in substance in my applications Serial No. 188,784, Serial No. 188,785, Serial No. 188,786, and Serial No. 188,787; but the present invention I consider to reside in the association of these mechanisms with the crank-shaft and the reciprocating valve, which, so far as I am aware, has never before been employed.

Having thus described my invention, what I claim as new, and desire to secure by Letters Patent, is—

1. In an electromagnetic valve, the combination with a valve-seat, of a valve for said seat, an electromagnet, an armature controlled by said electromagnet, a rotary crank-shaft operatively connected with the valve to open and close said valve, and means for turning said crank-shaft step by step in the same direction from said armature to alternately open and close the valve on successive energizations of the electromagnet.

2. In an electromagnetic valve, the combination with a valve-seat, of a valve for said seat, an electromagnet, an armature controlled by said electromagnet, a rotary crank-shaft operatively connected to the valve, a ratchet-wheel on said crank-shaft, and a pawl carried by the armature for turning said ratchet-wheel step by step in the same direction to open and close the valve on alternate energizations of the electromagnet.

3. In an electromagnetic valve, the combination with a valve-seat, of a solenoid, an armature slidable in said solenoid, a spring for projecting the armature, a valve for said valve-seat, a crank-shaft operatively connected with the valve, a ratchet-wheel on the crank-shaft, a pawl carried by the armature and engaging with the ratchet-wheel to turn the crank-shaft, and means for preventing backward turning of the crank-shaft.

4. In an electromagnetic valve, the combination with a valve-seat, of an electromagnet, an armature controlled by said electromagnet, a rotary crank-shaft operated by the armature, and a reciprocating valve having its stem connected to the crank-shaft and seated and unseated on the valve-seat by step-by-step turning of the crank-shaft in the same direction on alternate energizations of the electromagnet.

5. In an electromagnetic valve, the combination with a valve-seat, of an electromagnet, an armature controlled by the electromagnet, a spring for projecting the armature, a crank-shaft, a valve having its stem connected to the crank-shaft and which is adapted to seat and unseat on alternate energizations of the electromagnet, a ratchet-wheel on the crank-shaft, a pawl carried by the armature which engages with the ratchet-wheel, and a dog for preventing backward rotation of the ratchet-wheel.

6. In an electromagnetic valve, the combination with a valve-seat, of a solenoid, a sliding armature in the solenoid, a spring for projecting the armature from the solenoid, a crank-shaft, a valve having a stem connected to the crank-shaft and which is adapted to seat and unseat on alternate energizations of the solenoid, a ratchet-wheel on the crank-shaft, a pawl pivoted to the armature and engaging the ratchet-wheel, and a dog for engaging the ratchet-wheel to prevent backward turning thereof.

In testimony whereof I hereunto affix my signature in presence of two witnesses.

ISAAC G. WATERMAN.

Witnesses:
WALLACE R. SEAVEY,
ELMER SEAVEY.